(12) United States Patent
Haba et al.

(10) Patent No.: US 10,955,671 B2
(45) Date of Patent: Mar. 23, 2021

(54) STRETCHABLE FILM ASSEMBLY WITH CONDUCTIVE TRACES

(71) Applicant: Invensas Corporation, San Jose, CA (US)

(72) Inventors: Belgacem Haba, Saratoga, CA (US); Ilyas Mohammed, Santa Clara, CA (US); Gabriel Z. Guevara, Gilroy, CA (US); Min Tao, San Jose, CA (US)

(73) Assignee: Invensas Corporation, San Jose, CA (US)

( * ) Notice: Subject to any disclaimer, the term of this patent is extended or adjusted under 35 U.S.C. 154(b) by 0 days.

(21) Appl. No.: 16/136,776

(22) Filed: Sep. 20, 2018

(65) Prior Publication Data
US 2019/0273016 A1    Sep. 5, 2019

Related U.S. Application Data

(60) Provisional application No. 62/636,975, filed on Mar. 1, 2018.

(51) Int. Cl.
*H01L 23/49* (2006.01)
*G02B 27/01* (2006.01)

(52) U.S. Cl.
CPC .... *G02B 27/0172* (2013.01); *G02B 2027/015* (2013.01); *G02B 2027/0134* (2013.01); *G09G 2370/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,382,928 A * | 1/1995 | Davis | ................... | H03H 1/0007 333/182 |
| 7,465,678 B2 * | 12/2008 | Bhattacharya | ...... | H01L 51/0021 257/642 |
| 7,923,282 B2 * | 4/2011 | Frolov | .............. | H01L 31/03529 136/244 |
| 10,047,848 B2 | 8/2018 | Kaybidge et al. | | |
| 2015/0069573 A1 * | 3/2015 | Huang | ................... | H01G 4/228 257/532 |
| 2016/0165719 A1 * | 6/2016 | Li | ........................ | H05K 1/0283 361/749 |
| 2018/0192520 A1 * | 7/2018 | Choong | ................. | H05K 1/189 |

* cited by examiner

*Primary Examiner* — Moin M Rahman

(57) ABSTRACT

Apparatus and method relating generally to electronics are disclosed. In one such an apparatus, a film assembly has an upper surface and a lower surface opposite the upper surface. A dielectric film of the film assembly has a structured profile along the upper surface or the lower surface for having alternating ridges and grooves in a corrugated section in an at rest state of the film assembly. Conductive traces of the film assembly conform to the upper surface or the lower surface in or on the dielectric film in the corrugated section.

12 Claims, 7 Drawing Sheets

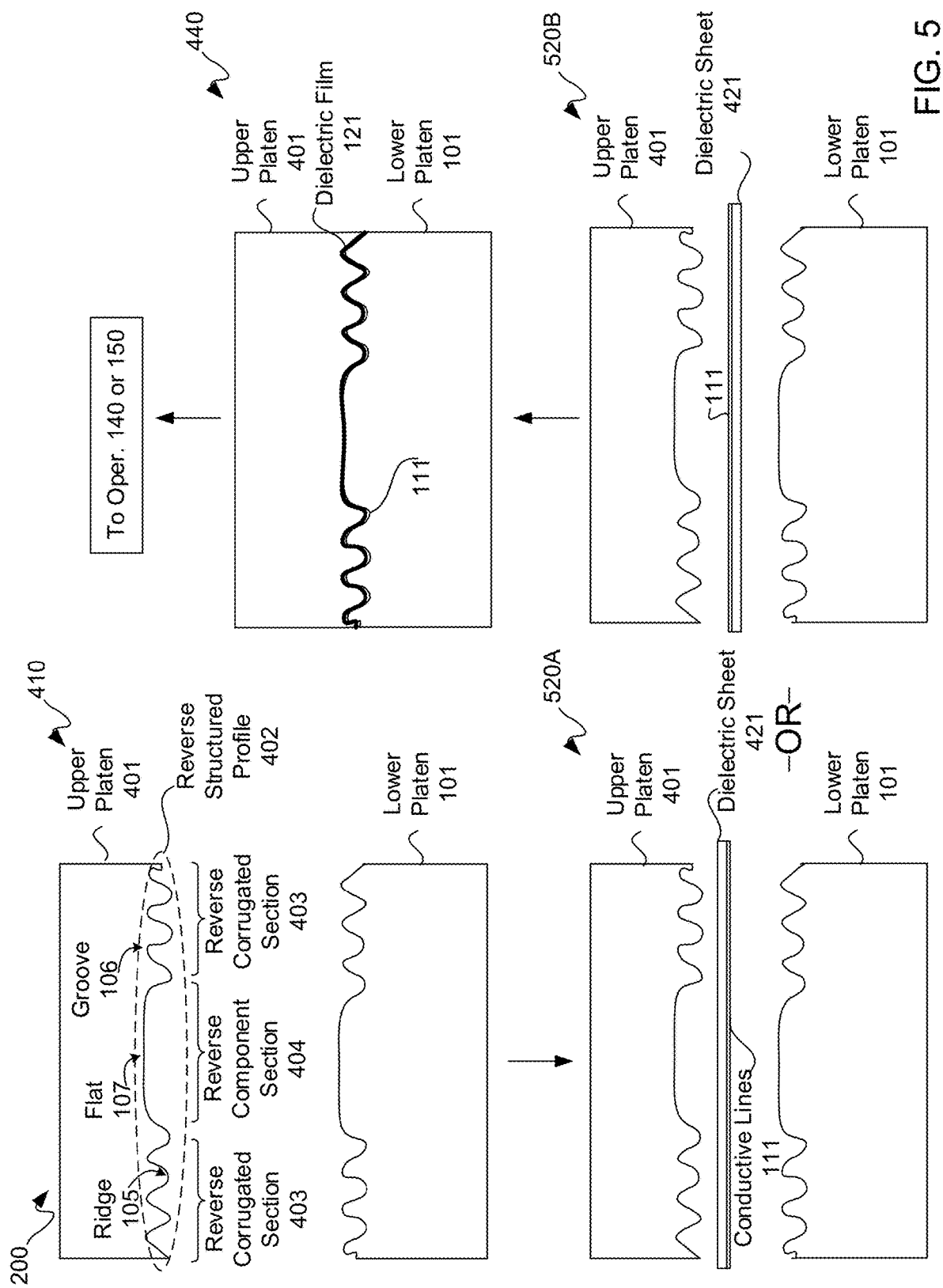

STRETCHABLE FILM ASSEMBLY WITH CONDUCTIVE TRACES

CROSS-REFERENCE TO RELATED APPLICATION(S)

This application hereby claims benefit of priority to U.S. Provisional Patent Application Ser. No. 62/636,975, filed on Mar. 1, 2018, entitled "Stretchable Film," which is incorporated by reference herein in its entirety for all purposes.

FIELD

The following description relates to electronic devices. More particularly, the following description relates to a stretchable film assembly with conductive traces.

BACKGROUND

Conventionally, a stretchable film had flat serpentine conductive traces in a same flat plane of such stretchable film. These serpentine conductive traces effectively were flat springs. Such flat springs could be stretched in a direction normal with respect to such serpentine pattern. However, such stretchable film conventionally was limited to about 1.6 times the length of such stretchable film in an at rest state, namely a 60% increase in length.

BRIEF DESCRIPTION OF THE DRAWING(S)

Accompanying drawing(s) show exemplary embodiment(s) in accordance with one or more aspects of exemplary apparatus(es) or method(s). However, the accompanying drawings should not be taken to limit the scope of the claims, but are for explanation and understanding only.

FIGS. 2-1 through 2-7 are top elevation views of block diagrams depicting examples of one or more film assemblies each.

FIGS. 3-1 through 3-4 are block diagrams of respective perspective views each depicting a section of an example of a film assembly.

FIG. 4 is a flow and cross-sectional block diagram depicting another exemplary stretchable film assembly flow for formation of a film assembly for electronics.

FIG. 5 is a flow and cross-sectional block diagram depicting yet another exemplary stretchable film assembly flow for formation of a film assembly for electronics.

FIG. 6 is a flow and cross-sectional block diagram depicting still yet another exemplary stretchable film assembly flow for formation of a film assembly for electronics.

DETAILED DESCRIPTION

Figure 1:
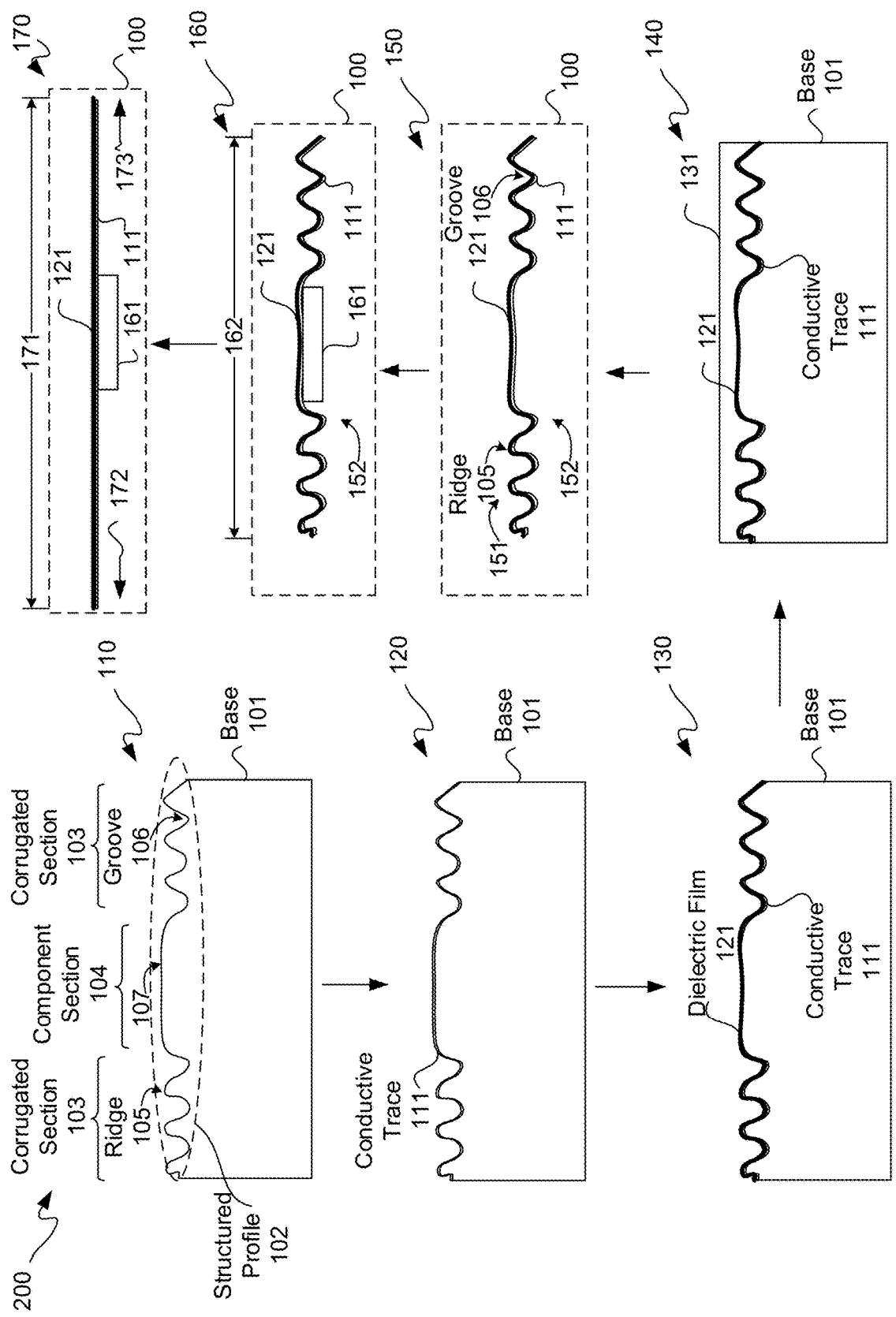
FIG. 1 is a flow and cross-sectional block diagram depicting an exemplary stretchable film assembly flow for formation of a film assembly for electronics.

In the following description, numerous specific details are set forth to provide a more thorough description of the specific examples described herein. It should be apparent, however, to one skilled in the art, that one or more other examples or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features. Use of terms such as "upper" and "lower" or other directional terms is made with respect to the reference frame of the figures and is not meant to be limiting with respect to potential alternative orientations, such as in further assemblies or as used in various systems.

Before describing the examples illustratively depicted in the several figures, a general introduction is provided to further understanding.

Again, conventionally, a stretchable film with serpentine conductive traces in a same flat plane of such stretchable film was used. This lead to differences in how such serpentine conductive traces and a corresponding dielectric film experienced stress or tension due to stretching. When such stretchable film was stretched, problems with delamination between dielectric film and serpentine conductive traces may be presented. For example, a stretched dielectric film may be thinner than such film in an at rest state, which thinning due to stretching may promote delamination.

As described below in additional detail, a stretchable film assembly with conductive traces and a dielectric film is described. However, such dielectric film and conductive traces are contoured by conforming both to a structured undulating or wavy profile, as described below in additional detail. By having such a structured profile, conductive traces and a corresponding dielectric film experience tension in a stretched state in a same or substantially similar manner. This may reduce delamination failures.

Furthermore, by having an undulating, wavy or corrugated ("corrugated") structured profile of a dielectric film, such dielectric film may be stretched to be substantially longer than a length or longitudinal spread of such profiled dielectric film at an at rest state ("at rest length"). For example, such a stretchable film assembly with conductive traces and a dielectric film may be stretch 1.5 or more times an at rest length thereof. However, stretching of stretchable film assembly may be used in applications where for example such film assembly is stretched to 2 to 5 times an at rest length thereof, which was not available with above-described conventional film assemblies.

With the above general understanding borne in mind, various configurations for a stretchable film assembly with conductive traces are generally described below. Though an example of conductive traces as signal lines, including without limitation power and ground, is used, such conductive traces or other conductive elements may be used for implementing different circuit components, such as resistors and/or inductors for example. However, for purposes of clarity by way of example and not limitation conductive traces for signal lines are described.

An apparatus relates generally to electronics. In such an apparatus, a film assembly has an upper surface and a lower surface opposite the upper surface. A dielectric film of the film assembly has a structured profile along the upper surface or the lower surface for having alternating ridges and grooves in a corrugated section in an at rest state of the film assembly. Conductive traces of the film assembly conform to the upper surface or the lower surface in or on the dielectric film in the corrugated section.

A method relates generally to electronics. In such a method, obtained is a base having a contoured surface to provide a structured profile for having a corrugated section with alternating ridges and grooves. Conductive traces are formed over the contoured surface of the base in the corrugated section conformably with the alternating ridges and grooves. A dielectric film is formed over the conductive traces and over a remainder of the contoured surface of the base in the corrugated section conformably with the alternating ridges and grooves for having a film assembly with an upper surface and a lower surface opposite the upper surface. The film assembly is released from the base with the structured profile along the lower surface with the alternating ridges and grooves in an at rest state of the film assembly.

Another method relates generally to electronics. In such a method, obtained is a base having a contoured surface to provide a structured profile for having a corrugated section with alternating ridges and grooves. A dielectric film is formed over the contoured surface of the base in the corrugated section conformably with the alternating ridges and grooves. Conductive traces are formed over the dielectric film in the corrugated section conformably for having the alternating ridges and grooves for having a film assembly with an upper surface and a lower surface opposite the upper surface. The film assembly is released from the base with the structured profile along the lower surface with the alternating ridges and grooves in an at rest state of the film assembly.

Yet another method relates generally to electronics. In such a method, obtained is a sheet of a dielectric film having conductive traces. Obtained is a lower platen having a contoured surface to provide a structured profile for having a corrugated section with alternating ridges and grooves. Obtained is an upper platen having a reverse contoured surface to the contoured surface for interlocked engagement with the lower platen to impart the structured profile to the sheet. The sheet is pressed between the upper platen and the lower platen under heat and pressure for contouring the sheet to provide the conductive traces and the dielectric film contoured to the corrugated section conformably with the alternating ridges and grooves for having a film assembly with an upper surface and a lower surface opposite the upper surface. The film assembly is released from between the lower platen and the upper platen.

Other features will be recognized from consideration of the remainder of the Detailed Description and Claims, which follow.

FIG. 1 is a flow and cross-sectional block diagram depicting an exemplary stretchable film assembly flow 200 for formation of a film assembly 100 for electronics. A film assembly 100 has an upper surface 151 and a lower surface 152 opposite upper surface 151. A dielectric film 121 of film assembly 100 has a structured profile 102 along upper surface 151 or lower surface 152 for having alternating ridges 105 and grooves 106 in a corrugated section 103 in an at rest state of film assembly 100.

Conductive traces 111 of film assembly 100 are conformably along upper surface 151 or lower surface 152 in or on dielectric film 121 in corrugated section 103. Dielectric film 121 of film assembly 100 in this example includes a component section 104 of structured profile 102 of dielectric film 121 along upper surface 151 or lower surface 152 in at rest state of film assembly 100 located adjacent to corrugated section 103.

In this example, there are two corrugated sections 103 each having alternating ridges 105 and grooves 106. In this example of a dielectric film 121 of film assembly 100, each of such corrugated sections 103 of structured profile 102 of dielectric film 121 along upper surface 151 or lower surface 152 for each such section has alternating ridges 105 and grooves 106 in at rest state of film assembly 100.

A component section 104 of structured profile 102 of dielectric film 121 along upper surface 151 or lower surface 152 in at rest state of film assembly 100 may be located between first corrugated section 103 and second corrugated section 103. Conductive traces 111 of film assembly 100 may be conformably along upper surface 151 or lower surface 152 in or on dielectric film 121 in both corrugated sections 103.

Conductive traces 111 may extend from a left corrugated section 103 and a right corrugated section 103 into component section 104 and may be configured for interconnection of a microelectronic component 161. Such component section 104 may be configured for interconnection of a microchip or a semiconductor die as a microelectronic component 161. Component section 104 may include a flat surface 107 for receipt of microchip or semiconductor die as such a microelectronic component 161.

With the above description borne in mind, stretchable film assembly flow 200 is described. At operation 110, a base 101 having a structured profile 102 may be obtained for having at least one corrugated section 103 with alternating ridges 105 and grooves 106. Base 101 may be made of stainless steel or other electrically conductive material for a subsequent electroplating and/or electrophoresis operation. A difference of coefficient of thermal expansion ("CTE") between stainless steel and other materials in contact with base 101 may facilitate release of a film assembly 100 from such base 101.

At operation 120, conductive traces 111 may be formed over contoured surface of base 101 in corrugated sections 103 conformably with alternating ridges 105 and grooves 106. Conductive traces 111 may be formed by electroplating, patterned deposition, printing, or other conductive trace forming process. In this example, conductive traces 111 may be formed of copper, silver or gold; however, other electrical conductor materials may be used in other examples.

At operation 130, a dielectric film 121 may be formed over conductive traces 111 and over a remainder of contoured surface of base 101 in corrugated section 103 conformably with alternating ridges 105 and grooves 106 for having a film assembly 100 with an upper surface 151 and a lower surface 152 opposite upper surface 151. Surface areas of conductive traces 111 facing an upper surface of base 101 may cover only a portion, as depicted for example below with reference to FIGS. 2-1 to 2-7, of an upper surface area of such upper surface of base 101 leaving a remainder of an upper surface area of such upper surface of base 101 to be covered by dielectric film 121.

Dielectric film 121 may be formed or adhered to conform to structured profile 102 by positioning a dielectric sheet above and over base 101 and pulling such a dielectric sheet down onto a surface of base 101 having structured profile 102, such as by pulling with a vacuum or other suction, for causing such a dielectric sheet to conform to structured profile 102. Base 101 may be perforated for pulling by such a vacuum from a side opposite such structured profile 102, such as a lower surface of such base 101 in this example. For example, pulling with a vacuum to pull sheet down onto base 101 including over conductive traces 111 and over a remainder of contoured surface of base 101 in corrugated section 103 may cause such dielectric sheet to conform with alternating ridges 105 and grooves 106.

In another example, dielectric film 111 may be formed by depositing, such as conformally depositing for example, a dielectric material such as for example by electrophoresis or other conformal deposition process. Because base 101 is electrically conductive, a conformal depositing of dielectric material by an electrophoretic deposition or other cathodic or anodic conformal deposition may be used. Dielectric film 121 in this example is an epoxy-based or polyimide-based flexible material; however, other dielectric materials may be used in other examples.

In yet another example, operations 120 and 130 may be reversed. In such an example, dielectric film 121 is conformed to a structured profile 102 of base 101, and conductive traces 111 are formed on dielectric film 121 conforming to such structured profile 102 responsive to conformation by dielectric film 121.

At operation 140, an optional resist layer 131 may be deposited on an upper surface of dielectric film 121. Resist layer 131 may be patterned and used for forming a ball grid array (BGA) of contacts for interconnection with contacts of microelectronic component 161, such a flip-chip interconnection for example. Such optional resist layer 131 may be used to protect metal contacts for interconnection with a microelectronic component 161.

At operation 150, film assembly 100 may be removed or released from base 101 with structured profile 102 along lower surface 152 with alternating ridges 105 and grooves 106 in an at rest state of film assembly 100. At operation 160, a microelectronic component 161 may be coupled to film assembly 100 in a component section 104. In an at rest state of film assembly 100, film assembly 100 may have a length L 162.

At operation 170, film assembly 100 may be stretched, such as for use. Stretching film assembly 100 may straighten out ridges 105 and grooves 106, or at least have significantly smaller differences between peaks and valleys of ridges 105 and grooves 106, so as to generally straighten out dielectric film 121 and conductive traces 111. In a stretched state of film assembly 100, film assembly 100 may have an overall length 171 in a range of 1.5 L or more, and in some applications a 2 L to 5 L range. For applications where 3 or more times an at rest length L 162 is to be used, film assembly 100 may be used where cabling was previously used. Furthermore, ridges 105 and grooves 106 may be asymmetrical on opposing sides of a component section for having asymmetric lengths of stretch.

In a stretched state, conductive traces 111 and dielectric film 121 may experience same tensions. This is because both conductive traces 111 and dielectric film 121 may have same profiles, and in such a configuration conductive traces 111 and dielectric film 121 may be stretched in one or more same directions only.

Direction 172 and/or direction 173 opposite direction 172 may be respective directions of stretch. Ridges 105 and grooves 106 may be transverse, namely perpendicular or normal, with respect to direction of stretch 172 or 173.

Figures 1, 2:
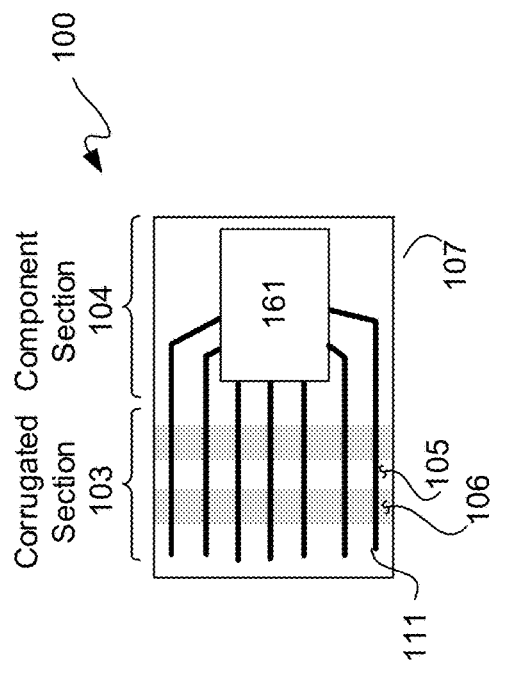
Figure 2:
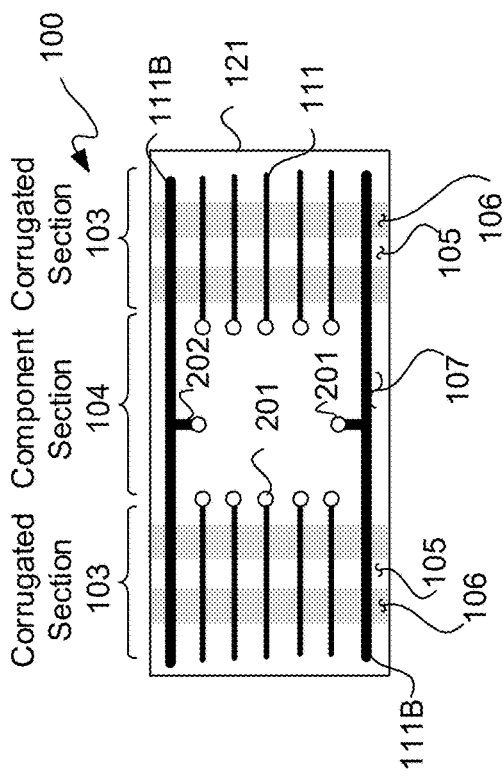

FIGS. 2-1 through 2-7 are top elevation views of block diagrams depicting examples of one or more film assemblies 100 each. In FIG. 2-1, conductive traces 111 extend from corrugated sections 103 into a middle component section 104. In this example, a conductive trace 111A extends from a corrugated section 103 through component section 104 to another corrugated section 103. Ridges 105 and grooves 106 of conductive traces 111 and dielectric film 121 in corrugated sections 103 are transverse 174 with respect to length of film assembly 100, namely are transverse with respect to a direction of stretch. A flat surface 107 in component section 104 may be for receipt of a microelectronic component 161. Microelectronic component 161 may be attached with flip-chip, ACF (anisotropic conductive film for agglomeration of conductive particles in a dielectric), or other attachment technology for electrical conductivity.

In FIG. 2-2, conductive traces 111 extend from a corrugated section 103 into a component section 104. Ridges 105 and grooves 106 of conductive traces 111 and dielectric film 121 in corrugated section 103 are transverse 174 with respect to length of film assembly 100, namely are transverse with respect to a direction of stretch. A flat surface 107 in component section 104 may be for receipt of a microelectronic component 161.

Figures 2, 3:
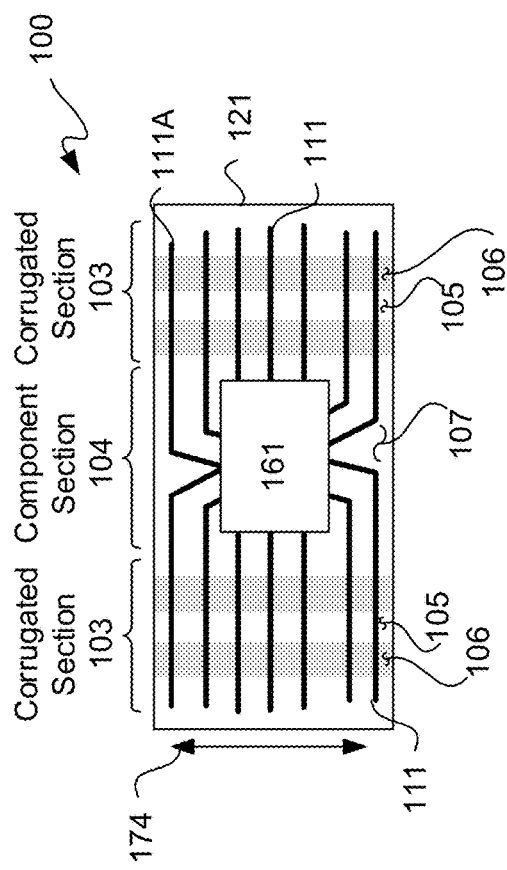

In FIG. 2-3, conductive traces 111 extend from corrugated sections 103 into and through a middle component section 104. In this example, wide conductive traces 111B extend from a corrugated section 103 through component section 104 to another corrugated section 103 such as for power or ground. Ridges 105 and grooves 106 of conductive traces 111 and dielectric film 121 in corrugated sections 103 are transverse 174 with respect to length of film assembly 100, namely are transverse with respect to a direction of stretch. A flat surface 107 in component section 104 may be for receipt of a microelectronic component 161.

Figures 2, 3, 4:
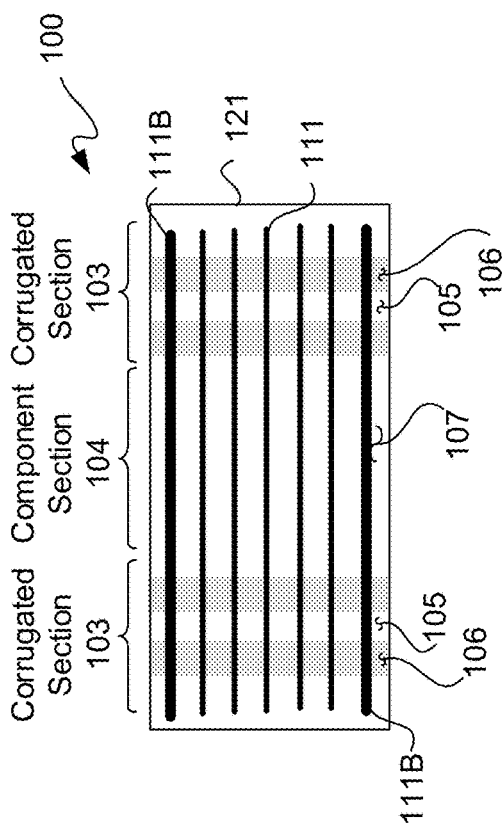

In FIG. 2-4, conductive traces 111 extend from corrugated sections 103 into and a middle component section 104. In this example, wide conductive traces 111B are the same as in FIG. 2-3, except with tee sections 202 in component section 104 respectively teeing off of conductive traces 111B and terminating in corresponding printed wire contacts 201. Thinner conductive traces 111 terminate in component section 104 with printed wire contacts ("circles") 201. Ridges 105 and grooves 106 of conductive traces 111 and dielectric film 121 in corrugated sections 103 are transverse 174 with respect to length of film assembly 100, namely are transverse with respect to a direction of stretch. A flat surface 107 in component section 104 may be for receipt of a microelectronic component 161.

In FIG. 2-5, conductive traces 111 extend from corrugated sections 103 into and a middle component section 104. In this example, an upper wide conductive trace 111B has tee sections 202 off in component section 104 respectively teeing off of such conductive trace 111B and terminating in corresponding printed pad contacts ("rectangles") 205. Other printed pad contacts 205 interconnected to opposing ends of conductive traces 111 may be used for interconnection, such as for example for a dermal or other attachment. For example, in the medical field, a patch using film assembly 100 may be adhered to human skin.

A lower conductive trace 111B has a ground plane pad 203 extending therefrom and formed in component section 104. Thinner conductive traces 111 terminate in component section 104 with printed pad contacts ("squares") 206. With a thinner conductive trace 111C having in component section 107 a delay and/or resistor 204; however, one or more of these or other thin film electronic components 204 may be formed. Ridges 105 and grooves 106 of conductive traces 111 and dielectric film 121 in corrugated sections 103 are transverse 174 with respect to length of film assembly 100, namely are transverse with respect to a direction of stretch. A flat surface 107 in component section 104 may be for receipt of a microelectronic component 161.

In FIG. 2-6, two instances of film assembly 100 of FIG. 2-1, namely film assembly 100-1 and 100-2, are interconnected end-to-end lengthwise by interconnect pads 207. Interconnect pads 207 may be soldered or otherwise coupled to one another for electrical conductivity.

In FIG. 207, a film assembly 100H has a horizontal orientation with a component section 104 and a corrugated section 103, as previously described. Conductive traces 111 and dielectric film 121 extend from corrugated section 103 to component section 104. However, in this example, conductive traces 111 in component section have right-angle bends for heading toward and interconnecting to interconnect pads 207 in component section 104 of film assembly 100H.

A film assembly 100V has a vertical orientation with a component section 104 in between corrugated sections 103, as previously described. Conductive traces 111 and dielectric film 121 extend from corrugated section 103 to and through component section 104 to another corrugated section and to interconnect pads 207 of such corrugated section. Interconnect pads 207 of film assemblies 100H and 100V may be soldered or otherwise coupled to one another for electrical conductivity to form an "L" film assembly as in FIG. 2-7.

FIGS. 3-1 through 3-4 are block diagrams of respective perspective views each depicting a section of an example of a film assembly 100. In film assembly 100 of FIG. 3-1, conductive trace 111 is in contact with and on a lower surface 301 of dielectric film 121. In film assembly 100 of FIG. 3-2, conductive trace 111 is in contact with and completely recessed in a channel 302 defined by dielectric film 121. A lower surface 301 of dielectric film 121 may be co-planar with a lower surface 304 of conductive trace 111.

In film assembly 100 of FIG. 3-3, conductive trace 111 is in contact with and partially recessed in a channel 302 defined in dielectric film 121. A lower surface 301 of dielectric film 121 may be above a lower surface 304 of conductive trace 111.

In film assembly 100 of FIG. 3-4, an upper dielectric film 121 has a lower surface 301 in contact with an upper surface of a conductive trace 111, and such conductive trace 111 has a lower surface in contact with an upper surface of a lower dielectric film 121. In this example, a conductive trace 111 may be sandwiched or laminated between two dielectric films 121.

FIG. 4 is a flow and cross-sectional block diagram depicting another exemplary stretchable film assembly flow 200 for formation of a film assembly 100 for electronics. In this example, at operation 410 obtained is a base 101 having a contoured surface to provide a structured profile 102 for having a corrugated section 103 with alternating ridges 105 and grooves 106. Such a structured profile 102 may have a component section 104 with a flat surface 107 as previously described.

In this example, base 101 is a lower platen 101 of or in a press. An upper platen 401 of or in such press may have a reverse or inverse contoured or shaped surface, namely an inverse structured profile 402, for spaced-apart or interlocking engagement with structured profile 102 of lower platen 101 to impart a structure profile 102 by pressing under heat, as described below in additional detail. Reverse structured profile 401 may include reverse or inverse corrugated sections 403 and a reverse or inverse component section 404 respectively corresponding to corrugated sections 103 and component section 104. Along those lines, reverse structured profile 402 of upper platen 401 may have alternating ridges 105 and grooves 106 in reverse corrugated sections 403 and a flat surface 107 in a reverse component section 404.

While waves of different heights for uniform or non-uniform stretch of may be present in corrugated section 103 and 403, for purposes of interlocking platens, in another example a sinusoidal or sinusoidal-like wave shape may be used for alternating ridges 105 and grooves 106. However, in this example, different curvatures for alternating ridges 105 and grooves 106 of right corrugated section 103 and left corrugated section 103 may be used. In some applications, flat surface 107 may not stretch when stretching one or more corrugated sections 103, which facilitates stability for interconnection of a microelectronic component 161.

At operation 420, a conductive trace 111 may be formed onto lower platen 101, as previously described with reference to FIG. 1. At operation 430, a dielectric sheet 421 for a dielectric film 121 may be obtained and placed between reverse structured profile 402 of upper platen 401 and structured profile 102 of lower platen 101.

At operation 440, dielectric sheet 421 of dielectric film 121 may be pressed between top platen 401 and lower platen 101 under heat and pressure with a press for contouring of dielectric sheet 421 to impart structured profile 102 to such dielectric sheet to provide dielectric film 121. Curing of such dielectric film 121 may occur prior to removal or release of film assembly 100 from a press.

After curing at operation 440, a film assembly 100 may be removed or released from between lower platen 101 and upper platen 401 at operation 150. In another example, film assembly 100 may be left in lower platen 101 or upper platen 401 for addition of a resist layer at operation 140. Subsequent processing of film assembly 100 may proceed as previously described and not repeated here for purposes of clarity and not limitation.

Figures 2, 3, 4, 5:
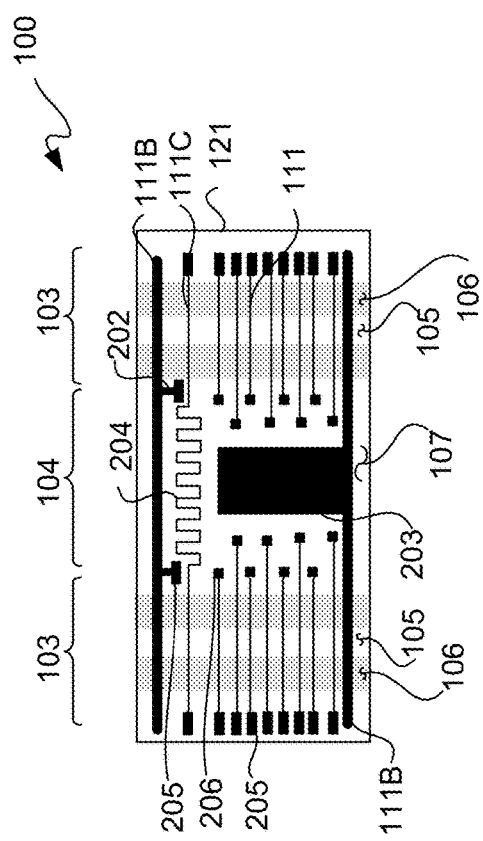

FIG. 5 is a flow and cross-sectional block diagram depicting yet another exemplary stretchable film assembly flow 200 for formation of a film assembly 100 for electronics. Operation 410 is the same as in FIG. 4, and hence description of same is not repeated.

At operation 520A or 520B, a dielectric sheet 421 for a dielectric film 121 having conductive traces 111 is obtained and placed between reverse structured profile 402 of upper platen 401 and structured profile 102 of lower platen 101. At operation 520A, conductive traces 111 are on a lower side of a dielectric sheet 421, and at operation 520, conductive traces 111 are on an upper side of a dielectric sheet 421, when positioned between such platens.

At operation 440, such dielectric sheet 421 with conductive traces 111 formed thereon, such as by printing or plating for example, may be pressed in a press between upper platen 401 and lower platen 101 under heat and pressure for contouring such sheet to provide conductive traces 111 and dielectric film 121 contoured to one or more corrugated sections 103-403 conformably with alternating ridges 105 and grooves 106, and optionally a component section 104-404 conformably with corresponding flat surfaces 107, for having a film assembly 100 with an upper surface 151 and a lower surface 152 opposite upper surface 151 after removal or release. Operation 440 and subsequent operation are as previously described, and thus not repeated.

Figures 2, 3, 4, 5, 6:
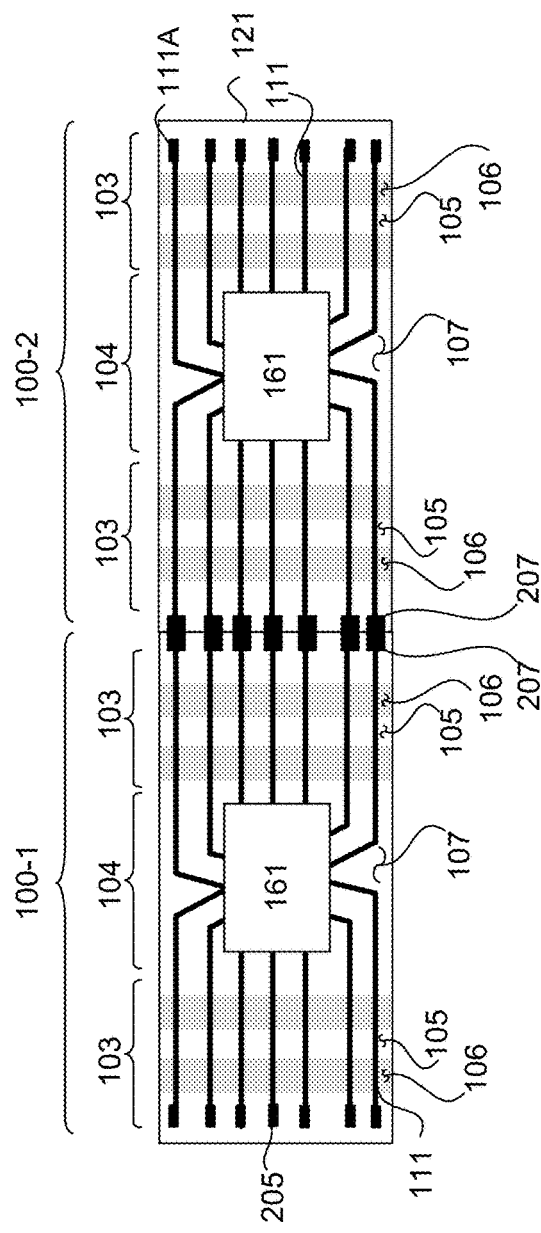
Figures 1, 3:
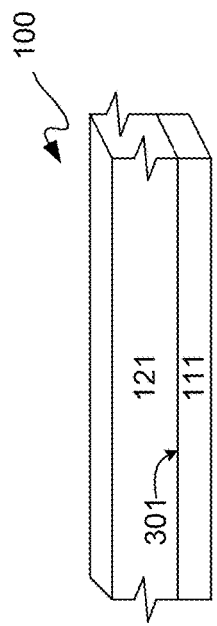
Figures 2, 3:
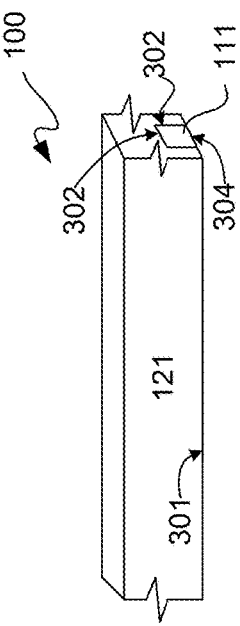
Figure 3:
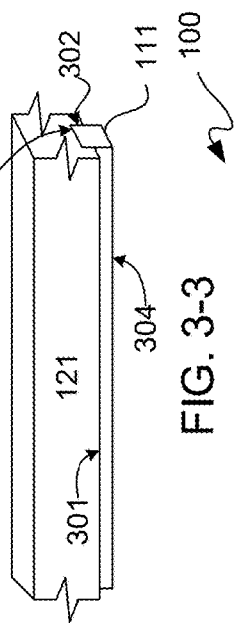
Figures 3, 4:
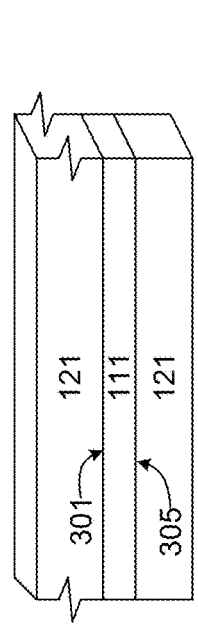
Figures 2, 3, 4, 5, 6, 7:
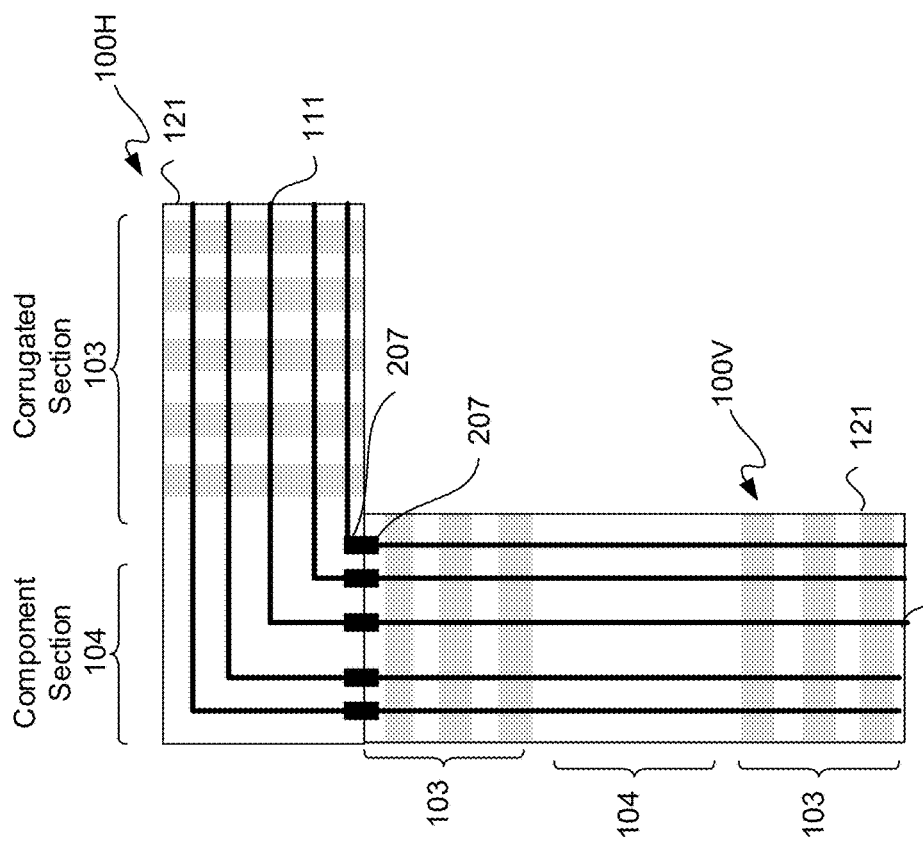
Figure 4:
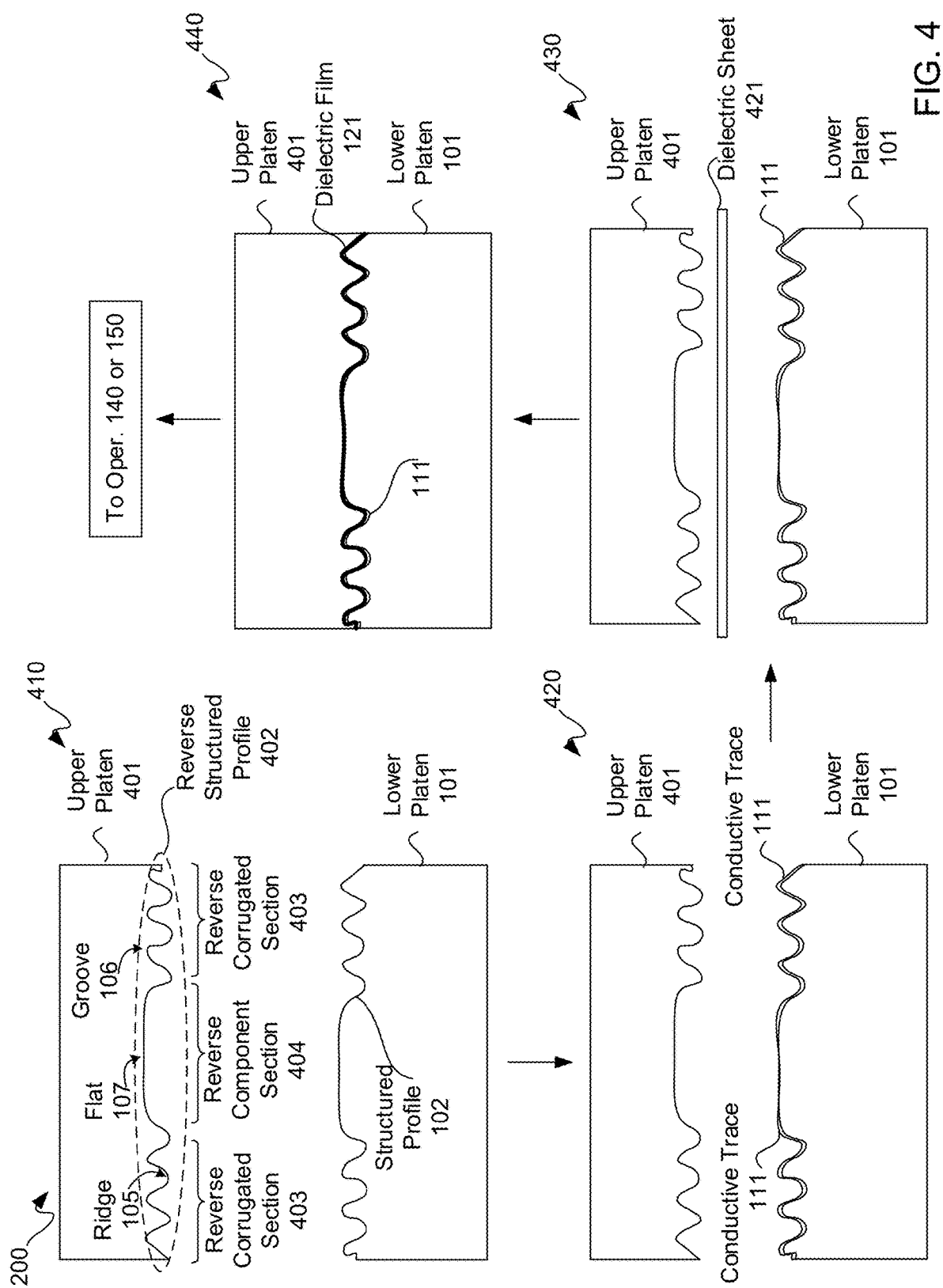
Figure 6:
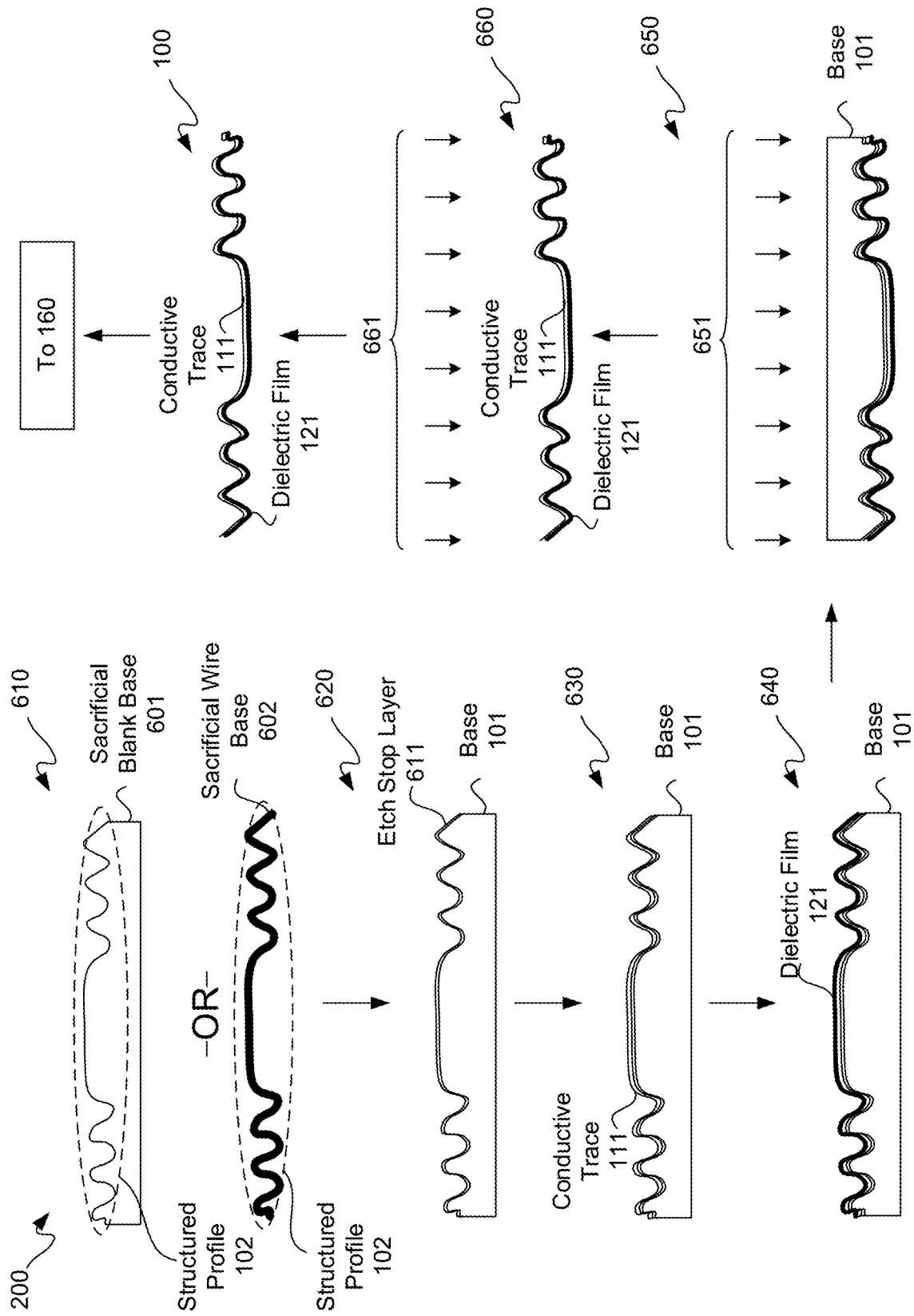

FIG. 6 is a flow and cross-sectional block diagram depicting still yet another exemplary stretchable film assembly flow 200 for formation of a film assembly 100 for electronics. At operation 610, a sacrificial blank base 601 or a sacrificial wire base 602 is obtained and contoured or shaped for having a structured profile 102, as previously described. For purposes of clarity by way of non-limiting example, it shall be assumed that sacrificial blank base 601 is used. However, a sacrificial wire base 602 may likewise be used as described in the following description in place of sacrificial blank base 601.

At operation 620, an etch stop layer 611 is formed over a contoured surface of sacrificial blank base 101 having a structured profile 102, such as in corrugated sections 103 and component section 104 in this example, conformably with alternating ridges 105 and grooves 106 and a flat section 107 prior to forming conductive traces 111. For purposes of clarity by way of example and not limitation, it shall be assumed that: sacrificial blank base 601 and conductive traces 111 are made of copper; and etch stop layer 611 is made of nickel. However, these and/or other materials may be used in accordance with the description herein.

At operation 630, conductive traces 111 may be formed on etch stop layer 611. Conductive traces 111 may be formed as previously described herein and thus not repeated. However, in some applications, conductive traces 111 may be formed of multiple layers of metal, including multiple layers of different metals, such as for example a gold-copper-gold or gold-copper layered structure.

At operation 640, a dielectric film 121 may be formed on etch stop layer 611 and conductive traces 111. Dielectric film 121 may be formed as previously described herein and thus not repeated.

At operation 650, film assembly 100 with etch stop layer 611 may be removed or released from sacrificial blank base 101 by etching with a copper etch 651 that stops on nickel etch stop layer 611. Accordingly, sacrificial blank base 101 may be etched away leaving film assembly 100 with etch stop layer 611.

At operation 660, optionally film assembly 100 may have etch stop layer 611 removed by etching with a nickel etch 661 that stops on copper conductive traces 111 and dielectric film 121. Accordingly, etch stop layer 611 may be etched away leaving film assembly 100 having conductive traces 111 and dielectric film 121 each with a structured profile 102, as previously described. However, in another example, etch stop layer 611 may be left in film assembly 100. In such an example, etch stop layer 611 may generally coincide with copper conductive traces. Subsequent operations, such as starting at operation 160 for example, as previously described may be performed, and such description is not repeated for purposes of clarity and not limitation.

While the foregoing describes exemplary embodiment(s) in accordance with one or more aspects of the disclosure, other and further embodiment(s) in accordance with the one or more aspects of the disclosure may be devised without departing from the scope thereof, which is determined by the claim(s) that follow and equivalents thereof. Each claim of this document constitutes a separate embodiment, and embodiments that combine different claims and/or different embodiments are within the scope of the disclosure and will be apparent to those of ordinary skill in the art after reviewing this disclosure. Claim(s) listing steps do not imply any order of the steps. Trademarks are the property of their respective owners.

What is claimed is:

1. An apparatus for electronics, comprising:
   a film assembly having an upper surface and a lower surface opposite the upper surface;
   a dielectric film of the film assembly having a conformed structured profile along the upper surface or the lower surface for having alternating ridges and grooves in a corrugated section in an at rest state of the film assembly; and
   conductive traces of the film assembly conformably along the upper surface or the lower surface in or on the dielectric film in the corrugated section;
   wherein the corrugated section is a first corrugated section having first alternating ridges and grooves, and wherein the dielectric film of the film assembly comprises:
      a second corrugated section of the conformed structured profile of the dielectric film along the upper grooves in the at rest state of the film assembly;
      a component section of the conformed structured profile of the dielectric film along the upper surface or the lower surface in the at rest state of the film assembly located between the first corrugated section and the second corrugated section;
      the conductive traces of the film assembly conformably along the upper surface or the lower surface in or on the dielectric film in both the first corrugated section and the second corrugated section; and
      each of the first corrugated section and the second corrugated section comprises the conformed structured profile for stretching the film assembly 1.5 or more times respective lengths of the first corrugated section and the second corrugated section with same tension on the dielectric film as on the conductive traces.

2. The apparatus according to claim 1, wherein the dielectric film of the film assembly comprises:
   a component section of the conformed structured profile of the dielectric film along the upper surface or the lower surface in the at rest state of the film assembly located adjacent to the corrugated section.

3. The apparatus according to claim 1, wherein the conductive traces extend from the first corrugated section and the second corrugated section into the component section and are configured for interconnection of a microelectronic component.

4. The apparatus according to claim 3, wherein the component section is configured for interconnection of a microchip or a semiconductor die as the microelectronic component.

5. The apparatus according to claim 4, wherein the component section comprises a flat surface for receipt of the microchip or the semiconductor die.

6. The apparatus according to claim 1, wherein a first portion of the conductive traces extend from the first corrugated section and the second corrugated section into the component section and a second portion of the conductive traces extend from the first corrugated section through the component section to the second corrugated section.

7. The apparatus according to claim 1, wherein the conductive traces extend from the first corrugated section and the second corrugated section into the component section and are configured to provide an electronic component.

8. The apparatus according to claim 1, wherein the first and the second alternating ridges and grooves of the conformed structured profile-of the first corrugated section and the second corrugated section, respectively, in the at rest state of the film assembly have a transverse orientation perpendicular with respect to a direction of stretch.

9. The apparatus according to claim 1, wherein the first and the second alternating ridges and grooves of the conformed structured profile of the first corrugated section and the second corrugated section, respectively, in the at rest state of the film assembly have a sinusoidal or sinusoidal-like wave shape.

10. The apparatus according to claim 1, wherein the first and the second alternating ridges and grooves of the conformed structured profile of the first corrugated section and the second corrugated section, respectively, in the at rest state of the film assembly respectively have first waves and second waves of different heights for non-uniform stretch of the first corrugated section and the second corrugated section.

11. The apparatus according to claim 1, wherein the first and the second alternating ridges and grooves of the conformed structured profile of the first corrugated section and the second corrugated section, respectively, in the at rest state of the film assembly respectively have first waves and second waves of different curvatures for non-uniform stretch of the first corrugated section and the second corrugated section.

12. The apparatus according to claim 1, wherein the conductive traces are partially in the dielectric film.

* * * * *